(12) United States Patent
Arditi

(10) Patent No.: US 12,719,283 B2
(45) Date of Patent: Aug. 25, 2026

(54) SOLAR TIME OF USE SYSTEMS AND METHODS

(71) Applicant: Tigo Energy, Inc., Campbell, CA (US)

(72) Inventor: Shmuel Sam Arditi, Discovery Bay, CA (US)

(73) Assignee: Tigo Energy, Inc., Campbell, CA (US)

( * ) Notice: Subject to any disclaimer, the term of this patent is extended or adjusted under 35 U.S.C. 154(b) by 0 days.

(21) Appl. No.: 18/988,476

(22) Filed: Dec. 19, 2024

(65) Prior Publication Data

US 2026/0180329 A1 Jun. 25, 2026

(51) Int. Cl.

*H02J 3/32* (2026.01)
*H02J 7/82* (2026.01)
*H02J 101/24* (2026.01)

(52) U.S. Cl.

CPC . *H02J 3/32* (2013.01); *H02J 7/82* (2026.01); *H02J 2101/24* (2026.01)

(58) Field of Classification Search

CPC ......... H02J 3/32; H02J 2300/24; H02J 7/0048
See application file for complete search history.

(56) References Cited

U.S. PATENT DOCUMENTS

2011/0273130 A1 11/2011 Lee et al.
2018/0269685 A1 9/2018 Sugeno et al.
2018/0287388 A1* 10/2018 Bates ........................ H02J 3/28
2019/0020197 A1 1/2019 Ahn et al.

FOREIGN PATENT DOCUMENTS

KR 102664227 5/2024
KR 102664227 B1 * 5/2024 ................ H02J 3/32
KR 102721664 10/2024

OTHER PUBLICATIONS

International Search Report and Written Opinion, PCT/US2025/059714, mailed on Apr. 15, 2026.

* cited by examiner

*Primary Examiner* — Robert L Deberadinis
(74) *Attorney, Agent, or Firm* — Greenberg Traurig

(57) ABSTRACT

A method includes determining, by a controller, an output level of a photovoltaic system. The method includes determining, by the controller, a load on the photovoltaic system. The method includes, in response to determining the output level is greater than the load, directing, by the controller, an excess output from the photovoltaic system to a battery of the photovoltaic system to charge the battery. The method includes, in response to determining the output level is less than the load, determining a charge level of the battery and weather associated with the photovoltaic system. When the charge level of the battery is greater than a charge threshold and the weather indicates further usage of the photovoltaic system, the method includes powering the load from the battery in addition to the photovoltaic system.

20 Claims, 3 Drawing Sheets

SOLAR TIME OF USE SYSTEMS AND METHODS

FIELD OF THE TECHNOLOGY

At least some embodiments disclosed herein relate generally to solar power systems. More specifically, the embodiments relate to solar power systems including time of use configurations.

BACKGROUND

Many buildings utilize photovoltaic systems. Many of these buildings are connected to the electrical utility grid as well as the photovoltaic system. In many configurations, the photovoltaic system can generate power which is transformed to an alternating current (AC). The photovoltaic system can be used to charge one or more batteries. In some cases, energy can be sold back to the utility provider. The usage of the battery versus drawing from the electrical grid can be balanced based on a variety of factors.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

The present disclosure relates to control of a photovoltaic system including time of use rates. "Time of use rates," or "TOU rates," as used herein, refer to an electricity pricing structure in which a cost of electricity varies depending on a time of date. For example, TOU rates can dictate that it costs more to purchase electricity during peak demand hours ("on-peak hours") and less during off-peak hours. On-peak hours often include hours that cover, for example, afternoons and off-peak hours often include hours that cover, for example, overnight. In some instances, there may be a mid-peak hours designation that covers all hours other than on-peak hours and off-peak hours. One example of a non-limiting schedule includes on-peak hours from 7 pm to 10 pm; off-peak hours from 12 am to 6 am; and mid-peak hours including all other hours. Each designation can include a different cost for electricity. In some cases, two of the periods could include the same costs, such as would be the case if there is only an on-peak and an off-peak designation.

Photovoltaic systems can be used to charge a battery that can be utilized to power one or more loads associated with the system. The battery may be connected to the photovoltaic system directly or thru other elements such an inverter, switch, combiner box, localized grid, a breaker, combinations thereof, or the like. In some cases, the photovoltaic system can also be used to provide power back to the utility grid. In such cases, the utility provider can purchase the energy back from the owner of the photovoltaic system. Generally, the purchase cost for the electricity is less than the electricity cost to the owner.

Embodiments of this disclosure are directed to methods and systems for operating a photovoltaic system in a TOU rate setup. For example, the methods and systems can be used to determine when to purchase power from the grid to, for example, charge the battery or run other loads associated with the system. The methods and systems can also be used to determine when to use the battery to avoid usage of the electricity provided from the utility grid. Such methods and systems can, for example, balance a user's loads with weather, time of day, seasonal information, combinations thereof, or the like.

As used herein, "loads" can include the electrical consumption of a house or other facility including a photovoltaic system.

Figure 1:
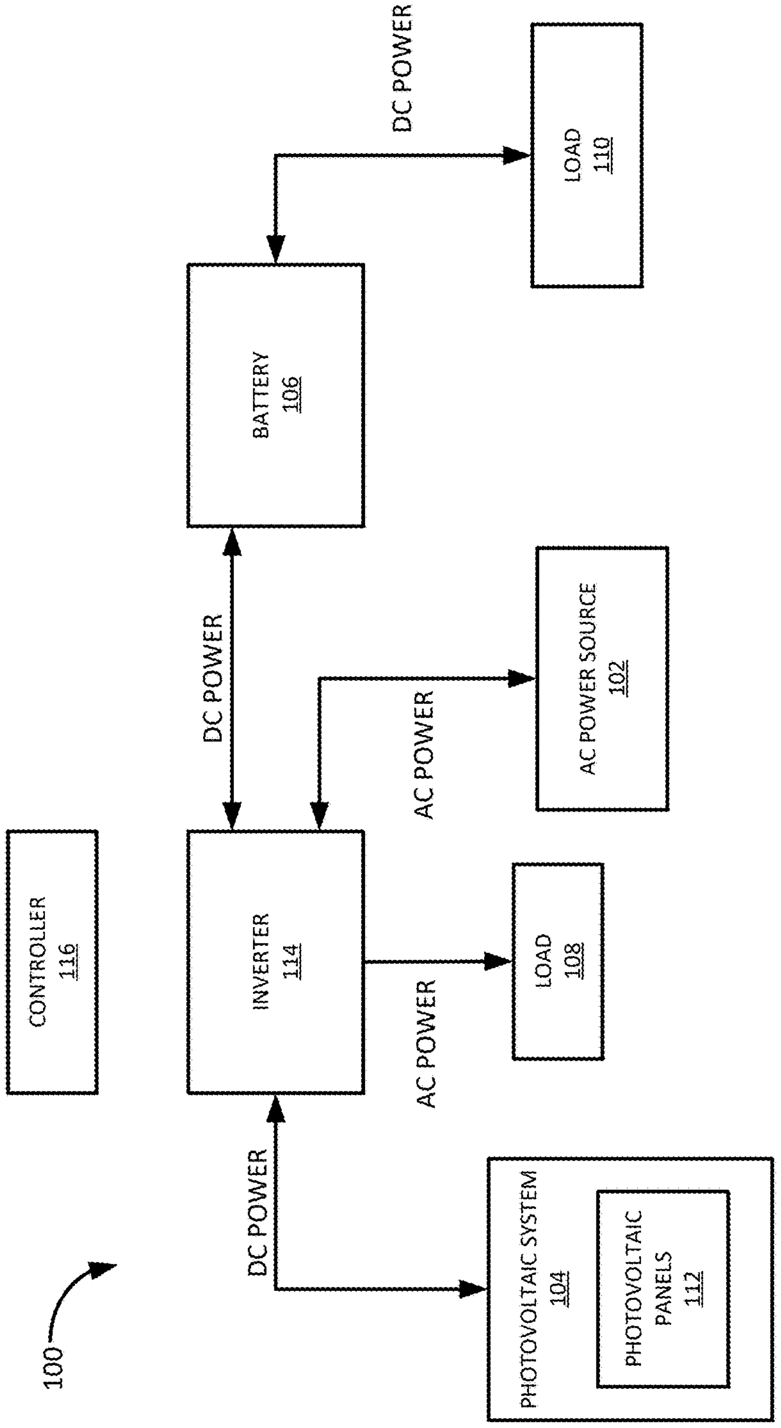
FIG. 1 shows a schematic diagram of a power system, according to some embodiments.

FIG. 1 shows a schematic diagram of a power system 100, according to some embodiments. In some embodiments, the power system 100 is capable of supplying a DC power signal to charge a battery or to supply power to a grid connection (e.g., as received from a photovoltaic system or the battery).

In the illustrated embodiment, the power system 100 includes an AC power source 102, a photovoltaic system 104, and a battery 106. The battery 106 is configured to provide a DC power output to any DC loads.

The AC power source 102 can be representative of a power grid. In some embodiments, the AC power source 102 can additionally include a generator (e.g., a backup power generator). In some embodiments, the AC power source can include other power sources capable of outputting an AC power signal. In some cases, the AC power source can also be a recipient of power, for example a grid being a recipient of the solar generated power.

In the illustrated embodiment, the photovoltaic system 104 includes a plurality of photovoltaic panels 112. The photovoltaic system 104 is capable of generating energy that can be used to supply energy to the battery 106, to the grid (e.g., AC power source 102), or to a load 108. It is to be appreciated that the photovoltaic system 104 can include additional components not described in detail in this Specification. The photovoltaic system 104 can be coupled with any building structure such as, but not limited to, a residential building, a commercial building, an industrial building, or the like.

In some embodiments, the photovoltaic system 104 is configured to output a DC power signal to an inverter 114. The inverter 114 can convert the DC power signal to an AC power signal and, for example, provide the AC power output from the inverter 114 back to the grid (e.g., AC power source 102) or directly to the load 108.

In some embodiments, the battery 106 is connected via a DC line to the inverter 114 to receive a DC power signal from the inverter 114, which can be output as a DC power signal to the load 110. In some embodiments, the inverter 114 is the only inverter in the power system 100.

In some embodiments, the battery 106 can receive power from the photovoltaic system 104. In some embodiments, the power signal supplied from the photovoltaic system 104 can be a DC power signal that is provided to the battery 106 without conversion between AC and DC. That is, the battery 106 can be connected to the photovoltaic system 104 in such a manner that a power conversion is unnecessary. In some embodiments, the battery 106 can receive power from the AC power source 102. In such embodiments, the AC power signal from the grid can be converted by the inverter 114 to a DC power signal.

In some embodiments, the battery 106 is bidirectional and thus capable of receiving power from the load 110 and providing the power to the inverter 114 and subsequently to the grid or the load 108.

In some embodiments, the battery 106 can receive a DC input signal and provide a DC output signal.

In some embodiments, the inverter 114 is the only inverter for the photovoltaic system 104. In some embodiments, the inverter 114 is connected in electrical communication with both the photovoltaic system 104 and the battery 106.

In operation, the photovoltaic system 104 outputs a DC power signal to the inverter 114, which can direct the power signal as an AC power signal to the AC power source 102 or the load 108 or can direct the power signal as a DC power signal to the battery 106. The inverter 114 can be controlled by a controller 116.

The controller 116 can be connected to, for example, one or more sensors capable of providing additional information to the controller about the environment in which the photovoltaic system 104 is operating. For example, the sensors can include temperature sensors, humidity sensors, or other ambient condition sensors capable of providing an input to the controller 116 relevant to the weather conditions in which the photovoltaic system 104 is operating. In some embodiments, the controller 116 is configured to be connected to one or more remote computers capable of providing additional information about the operating environment. For example, the controller 116 may be able to connect to a weather or other forecasting source to obtain information about the current and expected weather. In some embodiments, the controller 116 can connect to other environmental information such as, but not limited to, a season of the year corresponding to the location of the photovoltaic system 104. The information that can be drawn can include, but is not limited to, typical duration of sun during a day; expected sunset time; expected sunrise time; combinations thereof; or the like. It is to be appreciated that these are example, and that others can be utilized.

The controller 116 is configured to include one or more settings for the energy and battery management of the photovoltaic system 104. For example, the controller 116 can be configured to include a schedule indicative of the TOU schedule for the connected utility grid (e.g., AC power source 102). The controller 116 can be configured to include a scheduled time during which the battery 106 is configured to be charged by the AC power source 102. The controller 116 can be configured to include a scheduled time during which the battery 106 is configured to be used to power the load 108, the load 110, or a combination thereof. The controller 116 can also be configured to include a minimum battery charge threshold that must be reserved even during on-peak usage. For example, the minimum battery charge threshold can be used to save an amount of charge of the battery 106 for use in case of a power outage at the AC power source 102.

In general, the controller 116 is configured to limit periods in which the battery is being charged by the output of the photovoltaic system 104 to those periods in which the photovoltaic system 104 is producing more energy than is required by the combination of the load 108 and the load 110. Additionally, the controller 116 is configured to limit usage of the AC power source 102 to charge the battery 106, reducing an overall strain on the utility grid as well as a cost to the owner of the photovoltaic system 104. In some embodiments, the controller 116 is configured to leverage the battery 106 during on-peak hours as much as possible to minimize usage of the AC power source 102. In some embodiments, the controller 116 is configured to minimize a sale of power back to the AC power source 102, and instead leverage the photovoltaic system 104 for directly powering the load 108 and the load 110 and for charging the battery 106.

Figure 2:
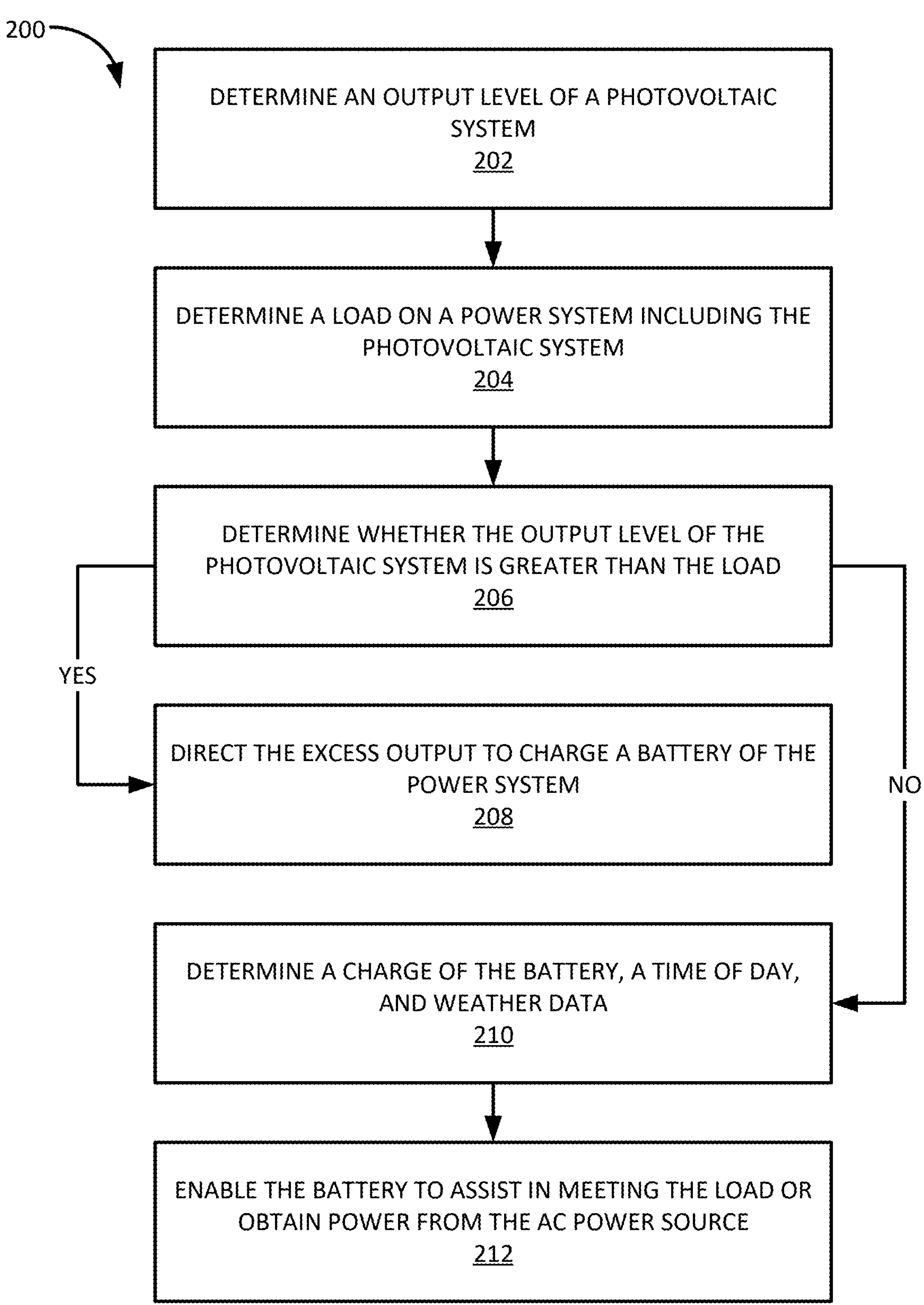
FIG. 2 shows a flowchart for a method, according to some embodiments.

FIG. 2 shows a flowchart for a method 200, according to some embodiments. The method 200 of FIG. 2 can be performed by the controller 116 (FIG. 1) within the power system 100 (FIG. 1).

In some embodiments, in operation of the power system 100, at block 202, the method 200 includes determining an output level of a photovoltaic system 104 (FIG. 1).

In some embodiments, at block 204, the method 200 includes determining, by the controller 116, a load on the power system 100. For example, the method includes determining the load 108. It is to be appreciated that the load 108 includes a plurality of different loads. For example, the loads can include lighting; heating, ventilation, and air conditioning (HVAC) systems; combinations thereof; or the like.

In some embodiments, at block 206, the method 200 includes determining, by the controller 116, whether the determined output level of the photovoltaic system 104 is greater than the determined load.

In some embodiments, at block 208, if the determined output level of the photovoltaic system 104 is greater than the determined load, the method 200 includes directing the amount by which the determined output level is greater than the determined load to charge the battery 106 (FIG. 1). In some embodiments, block 208 can additionally or alternatively include directing some or all of the portion of determined output level that is greater than the determined load to the AC power source 102 (FIG. 1). In some embodiments, a portion of the determined output level that is greater than the determined load can be directed to charge the battery 106 and a portion can be directed to the AC power source 102. In some embodiments, the method 200 can include determining whether to charge the battery 106 or direct to the AC power source 102 using at least one of a time of day, an energy cost tier, a charge level of the battery, or weather conditions.

In some embodiments, at block 210, if the determined output level of the photovoltaic system 104 is less than the determined load, the method 200 includes determining a charge of the battery 106, a time of day, and the weather of the location of the photovoltaic system 104.

In some embodiments, at block 212, the controller 116 can enable the battery 106 to assist the photovoltaic system 104 in meeting the load requirements or can obtain power from the AC power source 102 to assist in meeting the load requirements. In some embodiments, the decision at block 212 can be made using the method 300 described in accordance with FIG. 3 below. In some embodiments, the controller 116 can determine at block 210 to not enable the battery, thus skipping block 212. The determination can be made using at least one of a time of day, an energy cot tier, a charge level of the battery, or weather conditions.

It is to be appreciated that the method 200 continues to repeat itself when the power system 100 is operational.

Figure 3:
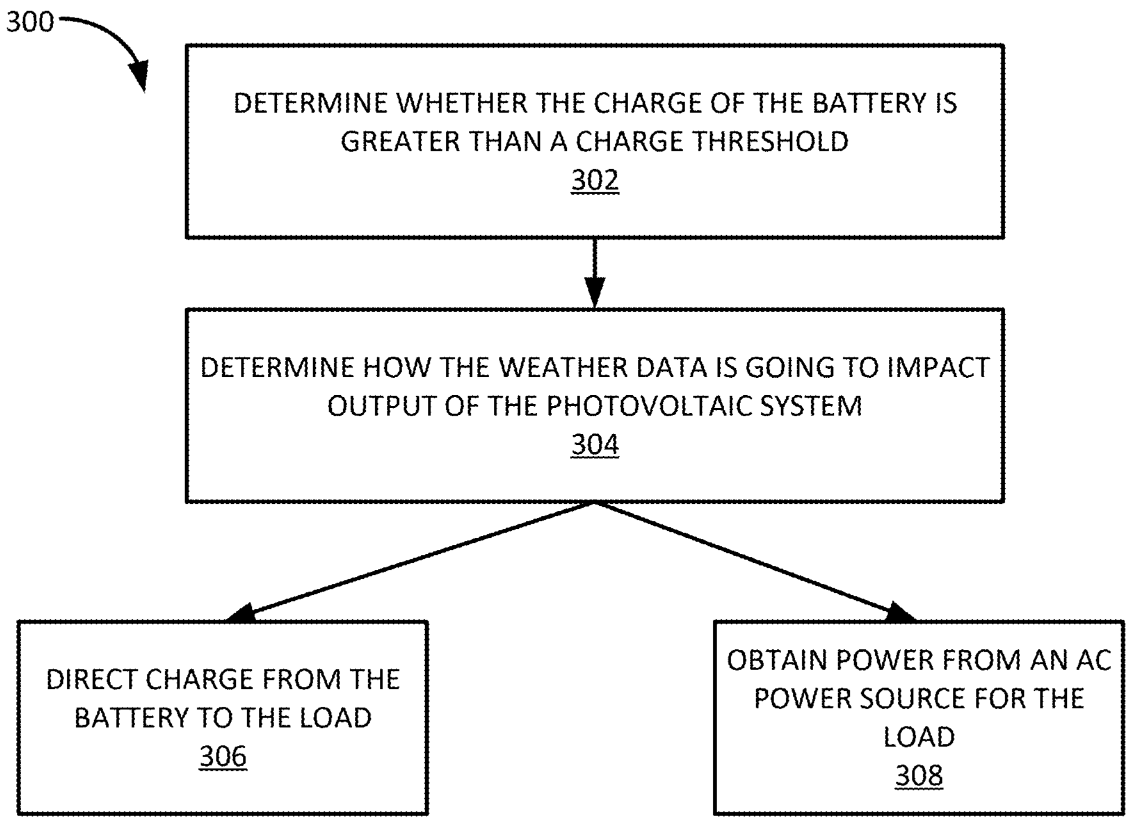
FIG. 3 shows a flowchart for a method, according to some embodiments.

FIG. 3 shows a flowchart for a method 300, according to some embodiments. The method 300 of FIG. 3 can be performed by the controller 116 (FIG. 1) within the power system 100 (FIG. 1). The method 300 can be performed at block 212 of the method 200 (FIG. 2).

In some embodiments, at block 302, the method 300 includes determining whether the charge of the battery 106 is to a level greater than a charge threshold. The charge threshold may be a level at which the battery 106 is depleted enough that there will be insufficient time to charge the battery 106 from the photovoltaic system 104 prior to a beginning of an on-peak TOU rate.

In some embodiments, at block 304, the method 300 includes determining, from the weather data, how likely the photovoltaic system 104 is to be able to meet the load requirements and whether the weather at a later time is likely to increase or decrease an output of the photovoltaic system 104. For example, the controller 116 can use the weather data to predict whether clouds are likely to increase, thus decreasing the output of the photovoltaic system 104. In some embodiments, the controller 116 can also use the weather data to predict whether clouds are likely to decrease, thus increasing the output of the photovoltaic system 104.

In some embodiments, at block 306, the method 300 includes directing charge from the battery 106 to the load 108 or the load 110 based on the determinations at block 302 and at block 304. In some embodiments, the charge level can be above the charge threshold and thus the battery 106 can be leveraged. In some embodiments, the charge level can be below the charge threshold, but the weather data can indicate that favorable conditions are likely prior to the on-peak TOU rate timing.

In some embodiments, at block 308, the method 300 includes obtaining power from AC power source 102 to power the load 108, the load 110, or combination thereof based on the determinations at block 302 and at block 304. In some embodiments, the AC power source 102 can be used when the charge level is below the charge threshold. In some embodiments, the charge level can be above the charge threshold, but the weather data may indicate that there are likely to be unfavorable conditions for usage of the photovoltaic system 104.

In some embodiments, a method including: determining, by a controller, an output level of a photovoltaic system; determining, by the controller, a load on the photovoltaic system; in response to determining the output level is greater than the load, directing, by the controller, an excess output from the photovoltaic system to a battery of the photovoltaic system to charge the battery; and in response to determining the output level is less than the load, determining a charge level of the battery and weather associated with the photovoltaic system; wherein when the charge level of the battery is greater than a charge threshold and the weather indicates further usage of the photovoltaic system, powering the load from the battery in addition to the photovoltaic system.

In some embodiments, a method, further including determining a time of day; wherein powering the load from the battery in addition to the photovoltaic system is dependent upon being in an off-peak time of use rate window.

In some embodiments, a method, further including determining a season in which the photovoltaic system is operating; wherein powering the load from the battery in addition to the photovoltaic system is dependent upon being in a sunny season.

In some embodiments, a method, further including determining an expected sunset time; wherein powering the load from the battery in addition to the photovoltaic system is dependent upon being a minimum threshold of time before the expected sunset time.

In some embodiments, a method, wherein when the charge level of the battery is less than the charge threshold, powering the load from a utility grid in addition to the photovoltaic system.

In some embodiments, a method, further including preventing, by the controller, charging of the battery from a utility grid.

In some embodiments, a method, in response to determining the output level is greater than the load, determining the charge level of the battery; wherein when the charge level of the battery is 100%, providing, by the controller, additional excess power to a utility grid.

In some embodiments, a method, wherein when the charge level of the battery is less than the charge threshold and the weather indicates a reduced output of the photovoltaic system, powering the load from a utility grid in addition to the photovoltaic system.

In some embodiments, a method, wherein when the weather indicates a reduced output of the photovoltaic system, the weather includes an indication of cloudiness.

In some embodiments, a method, further including powering the load from the battery during an on-peak time of use rate window.

In some embodiments, a method, wherein in response to the charge level of the battery being less than a minimum threshold, powering the load from a utility grid and disabling the battery.

In some embodiments, a method, wherein the battery is not charged by a utility grid.

In some embodiments, a system including: a photovoltaic system; a battery, wherein the battery is configured to be charged by the photovoltaic system; and a controller configured to: determine an output level of a photovoltaic system; determine a load on the photovoltaic system; in response to determining the output level is greater than the load, direct an excess output from the photovoltaic system to a battery of the photovoltaic system to charge the battery; and in response to determining the output level is less than the load, determine a charge level of the battery and weather associated with the photovoltaic system; wherein when the charge level of the battery is greater than a charge threshold and the weather indicates further usage of the photovoltaic system, power the load from the battery in addition to the photovoltaic system.

In some embodiments, a system, wherein the controller is configured to determine a time of day; wherein powering the load from the battery in addition to the photovoltaic system is dependent upon being in an off-peak time of use rate window.

In some embodiments, a system, wherein the controller is configured to determine a season in which the photovoltaic system is operating; wherein powering the load from the battery in addition to the photovoltaic system is dependent upon being in a sunny season.

In some embodiments, a system, wherein the controller is configured to determine an expected sunset time; wherein powering the load from the battery in addition to the photovoltaic system is dependent upon being a minimum threshold of time before the expected sunset time.

In some embodiments, a system, wherein when the charge level of the battery is less than the charge threshold, powering the load from a utility grid in addition to the photovoltaic system.

In some embodiments, a system, wherein the controller is configured to prevent charging of the battery from a utility grid.

In some embodiments, a system, in response to determining the output level is greater than the load, determining the charge level of the battery; wherein when the charge level of the battery is 100%, providing, by the controller, additional excess power to a utility grid.

In some embodiments, a system, wherein when the charge level of the battery is less than the charge threshold and the weather indicates a reduced output of the photovoltaic system, powering the load from a utility grid in addition to the photovoltaic system.

In some embodiments, a system, wherein when the weather indicates a reduced output of the photovoltaic system, the weather includes an indication of cloudiness.

In some embodiments, a system, wherein the controller is configured to power the load from the battery during an on-peak time of use rate window.

In some embodiments, a system, wherein in response to the charge level of the battery being less than a minimum threshold, powering the load from a utility grid and disabling the battery.

In some embodiments, a system, wherein the battery is not charged by a utility grid.

In some embodiments, a method including: determining, by a controller, an output level of a photovoltaic system; determining, by the controller, a load on the photovoltaic system; in response to determining the output level is greater than the load, determining, by the controller, whether to send an excess output from the photovoltaic system to a battery of the photovoltaic system to charge the battery or to send the excess output from the photovoltaic system to a utility grid, wherein the determining is based on at least one of a time of day, an energy cost tier, a charge level of the battery, or weather conditions.

In some embodiments, a method, further including determining the time of day; wherein sending the excess output to the battery is dependent upon being in a low-price purchase rate window.

In some embodiments, a method, further including determining a season in which the photovoltaic system is operating; wherein sending the excess output to the battery is dependent upon being in a sunny season.

In some embodiments, a method, further including determining an expected sunset time; wherein sending the excess output to the battery is dependent upon being a maximum threshold of time before the expected sunset time.

In some embodiments, a method, wherein when the charge level of the battery is less than a charge threshold, sending the excess output to the battery.

In some embodiments, a method, further including preventing, by the controller, charging of the battery from a utility grid.

In some embodiments, a method, in response to determining the output level is greater than the load, determining the charge level of the battery; wherein when the charge level of the battery is 100%, sending, by the controller, excess output to the utility grid.

In some embodiments, a method, wherein when the charge level of the battery is less than a charge threshold and the weather indicates a reduced output of the photovoltaic system, sending, by the controller, the excess output to the battery.

In some embodiments, a method, wherein when the weather indicates a reduced output of the photovoltaic system, the weather includes an indication of cloudiness.

In some embodiments, a method, wherein the battery is not charged by a utility grid.

In some embodiments, a method including: determining, by a controller, an output level of a photovoltaic system; determining, by the controller, a load on the photovoltaic system; in response to determining the output level is less than the load, determining, by the controller, whether to power the load from a battery of the photovoltaic system in addition to the photovoltaic system, wherein the determining is based on at least one of a time of day, an energy cost tier, a charge level of the battery, or weather conditions.

In some embodiments, a method, further including determining the time of day; wherein powering the load from the battery in addition to the photovoltaic system is dependent upon being in an off-peak time of use rate window.

In some embodiments, a method, further including determining a season in which the photovoltaic system is operating; wherein powering the load from the battery in addition to the photovoltaic system is dependent upon being in a sunny season.

In some embodiments, a method, further including determining an expected sunset time; wherein powering the load from the battery in addition to the photovoltaic system is dependent upon being a minimum threshold of time before the expected sunset time.

In some embodiments, a method, wherein when the charge level of the battery is less than a charge threshold, powering the load from a utility grid in addition to the photovoltaic system.

In some embodiments, a method, further including preventing, by the controller, charging of the battery from a utility grid.

In some embodiments, a method, wherein when the charge level of the battery is less than a charge threshold and the weather indicates a reduced output of the photovoltaic system, powering the load from a utility grid in addition to the photovoltaic system.

In some embodiments, a method, wherein when the weather indicates a reduced output of the photovoltaic system, the weather includes an indication of cloudiness.

In some embodiments, a method, further including powering the load from the battery during an on-peak time of use rate window.

In some embodiments, a method, wherein in response to the charge level of the battery being less than a minimum threshold, powering the load from a utility grid and disabling the battery.

In some embodiments, a method includes determining, by a controller, an output level of a photovoltaic system; determining, by the controller, a load on the photovoltaic system; wherein when the charge level of the battery is less than a charge threshold, determining whether to power the battery from a utility grid in addition to the photovoltaic system; wherein the determining is based on at least one of a time of day, an energy cost tier, a charge level of the battery, or weather conditions.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

What is claimed is:

1. A method comprising:

determining, by a controller, an output level of a photovoltaic system;

determining, by the controller, a load on the photovoltaic system;

in response to determining the output level is greater than the load, determining, by the controller, whether to send an excess output from the photovoltaic system to a battery connected to the photovoltaic system to charge the battery or to send the excess output from the photovoltaic system to a utility grid, wherein the determining is based on at least one of a time of day, an energy cost tier, or weather conditions;

wherein the determining is additionally based on a charge level of the battery;

wherein the charge level of the battery is compared to a charge threshold;

wherein the charge threshold comprises a level at which the battery cannot be charged prior to a beginning of an on-peak time-of-use rate.

2. The method of claim 1, further comprising determining the time of day;

wherein sending the excess output to the battery is dependent upon being in a low-price purchase rate window.

3. The method of claim 1, further comprising determining a season in which the photovoltaic system is operating;

wherein sending the excess output to the battery is dependent upon being in a sunny season.

4. The method of claim 1, further comprising determining an expected sunset time;

wherein sending the excess output to the battery is dependent upon being a maximum threshold of time before the expected sunset time.

5. The method of claim 1, wherein when the charge level of the battery is less than the charge threshold, sending the excess output to the battery.

6. The method of claim 1, further comprising preventing, by the controller, charging of the battery from a utility grid.

7. The method of claim 1, in response to determining the output level is greater than the load, determining the charge level of the battery;

wherein when the charge level of the battery is one of greater than the charge threshold or 100%, sending, by the controller, excess output to the utility grid.

8. The method of claim 7, wherein when the charge level of the battery is less than the charge threshold and the weather indicates a reduced output of the photovoltaic system, sending, by the controller, the excess output to the battery.

9. The method of claim 8, wherein when the weather indicates a reduced output of the photovoltaic system, the weather includes an indication of cloudiness.

10. A method comprising:

determining, by a controller, an output level of a photovoltaic system;

determining, by the controller, a load on the photovoltaic system;

in response to determining the output level is less than the load, determining, by the controller, whether to power the load from a battery connected to the photovoltaic system in addition to the photovoltaic system, wherein the determining is based on at least one of a time of day, an energy cost tier, or weather conditions;

wherein the determining is additionally based on a charge level of the battery;

wherein the charge level of the battery is compared to a charge threshold;

wherein the charge threshold comprises a level at which the battery cannot be charged prior to a beginning of an on-peak time-of-use rate.

11. The method of claim 10, further comprising determining the time of day;

wherein powering the load from the battery in addition to the photovoltaic system is dependent upon being in an off-peak time of use rate window.

12. The method of claim 10, further comprising determining a season in which the photovoltaic system is operating;

wherein powering the load from the battery in addition to the photovoltaic system is dependent upon being in a sunny season.

13. The method of claim 10, further comprising determining an expected sunset time;

wherein powering the load from the battery in addition to the photovoltaic system is dependent upon being a minimum threshold of time before the expected sunset time.

14. The method of claim 10, wherein when the charge level of the battery is less than the charge threshold, powering the load from a utility grid in addition to the photovoltaic system.

15. The method of claim 10, further comprising preventing, by the controller, charging of the battery from a utility grid.

16. The method of claim 10, wherein when the charge level of the battery is less than the charge threshold and the weather indicates a reduced output of the photovoltaic system, powering the load from a utility grid in addition to the photovoltaic system.

17. The method of claim 16, wherein when the weather indicates a reduced output of the photovoltaic system, the weather includes an indication of cloudiness.

18. The method of claim 10, further comprising powering the load from the battery during an on-peak time of use rate window.

19. The method of claim 10, wherein in response to the charge level of the battery being less than the charge threshold, powering the load from a utility grid and disabling the battery.

20. A method comprising:

determining, by a controller, an output level of a photovoltaic system;

determining, by the controller, a load on the photovoltaic system;

wherein when a charge level of the battery is less than a charge threshold, determining whether to power the battery from a utility grid in addition to the photovoltaic system;

wherein the determining is based on at least one of a time of day, an energy cost tier, or weather conditions;

wherein the determining is additionally based on the charge level of the battery;

wherein the charge level of the battery is compared to the charge threshold;

wherein the charge threshold comprises a level at which the battery cannot be charged prior to a beginning of an on-peak time-of-use rate.

* * * * *